(12) United States Patent
Tan et al.

(10) Patent No.: US 12,474,401 B2
(45) Date of Patent: Nov. 18, 2025

(54) SYSTEMS AND METHODS FOR ISOLATING FAULTS IN DIE-TO-DIE INTERCONNECTS

(71) Applicant: Microsoft Technology Licensing, LLC, Redmond, WA (US)

(72) Inventors: Terrence Huat Hin Tan, Bayan Lepas (MY); Charles Walter Boecker, Ames, IA (US); Ravi Shivnaraine, Pickering (CA); Edwin Magtoto Gozun, Folsom, CA (US); Sokratis Vamvakos, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

(21) Appl. No.: 18/464,529

(22) Filed: Sep. 11, 2023

(65) Prior Publication Data

US 2025/0085341 A1    Mar. 13, 2025

(51) Int. Cl.
*G01R 31/28* (2006.01)
*G01R 31/66* (2020.01)

(52) U.S. Cl.
CPC ..... *G01R 31/2896* (2013.01); *G01R 31/2884* (2013.01); *G01R 31/66* (2020.01)

(58) Field of Classification Search
CPC ............... G01R 31/28; G01R 31/2896; G01R 31/2884; G01R 31/66; G01R 31/318513; G01R 31/3185; H01L 22/14; H01L 23/50; H01L 23/5383; H01L 23/538; H01L 2225/06513; H01L 25/065; H01L 2225/06517; H01L 25/0652

See application file for complete search history.

(56) References Cited

U.S. PATENT DOCUMENTS

| 11,257,560 | B2 | 2/2022 | Chakravarty et al. |
| 2017/0110407 | A1* | 4/2017 | Chaware ................. H01L 24/13 |
| 2019/0227963 | A1* | 7/2019 | Ooi ......................... G06F 30/34 |

(Continued)

OTHER PUBLICATIONS

International Search Report and Written Opinion received for PCT Application No. PCT/US2024/040479, Nov. 18, 2024, 13 pages.

(Continued)

*Primary Examiner* — Son T Le
(74) *Attorney, Agent, or Firm* — Michael T. Abramson; Jordan IP Law, LLC

(57) ABSTRACT

Systems and methods for isolating faults in die-to-die interconnects are provided. A method includes providing a first transmission path, along a die-to-die interconnect, from a transmitter associated with a first die to an asynchronous buffer associated with a second die. The method further includes providing a second transmission path from voltage reference circuitry associated with the second die to the asynchronous buffer associated with the second die. The method further includes simultaneously enabling both the first transmission path and the second transmission path to allow the asynchronous buffer to receive inputs from both the transmitter associated with the first die and the voltage reference circuitry associated with the second die, such that the inputs received by the asynchronous buffer are indicative of: (1) no failure in the die-to-die interconnect, (2) an open failure in the die-to-die interconnect, or (3) a short failure in the die-to-die interconnect.

20 Claims, 10 Drawing Sheets

(56) References Cited

U.S. PATENT DOCUMENTS

| | | |
|---|---|---|
| 2019/0295953 A1 | 9/2019 | Xie |
| 2024/0079081 A1* | 3/2024 | Baker .................. G11C 29/765 |
| 2024/0311950 A1* | 9/2024 | Panneer .................... G06T 1/20 |

OTHER PUBLICATIONS

"Heterogeneous Integrated Product Testability Best-Known Methods (BKM)", In Proceedings of IEEE EPS Test Committee, Dec. 10, 2021, 80 Pages.

Alon, et al., "Bunch of Wires PHY Specification", Published in Open Compute Project, May 20, 2022, 33 Pages.

Hin, et al., "Co-Optimizing Design, Package and Test for Microbump Probing to Achieve KGD", In Proceedings of IEEE EPS Test Committee, Apr. 2021, 4 Pages.

* cited by examiner

PROVIDING A FIRST TRANSMISSION PATH, ALONG A DIE-TO-DIE INTERCONNECT, FROM A TRANSMITTER ASSOCIATED WITH A FIRST DIE TO AN ASYNCHRONOUS BUFFER ASSOCIATED WITH A SECOND DIE
~1010

PROVIDING A SECOND TRANSMISSION PATH FROM VOLTAGE REFERENCE CIRCUITRY ASSOCIATED WITH THE SECOND DIE TO THE ASYNCHRONOUS BUFFER ASSOCIATED WITH THE SECOND DIE, WHERE THE VOLTAGE REFERENCE CIRCUITRY IS CONFIGURED TO SELECTIVELY OUTPUT A FIRST VOLTAGE OR A SECOND VOLTAGE, DIFFERENT FROM THE FIRST VOLTAGE
~1020

SIMULTANEOUSLY ENABLING BOTH THE FIRST TRANSMISSION PATH AND THE SECOND TRANSMISSION PATH TO ALLOW THE ASYNCHRONOUS BUFFER TO RECEIVE INPUTS FROM BOTH THE TRANSMITTER ASSOCIATED WITH THE FIRST DIE AND THE VOLTAGE REFERENCE CIRCUITRY ASSOCIATED WITH THE SECOND DIE, SUCH THAT THE INPUTS RECEIVED BY THE ASYNCHRONOUS BUFFER ARE INDICATIVE OF: (1) NO FAILURE IN THE DIE-TO-DIE INTERCONNECT, (2) AN OPEN FAILURE IN THE DIE-TO-DIE INTERCONNECT, OR (3) A SHORT FAILURE IN THE DIE-TO-DIE INTERCONNECT
~1030

SYSTEMS AND METHODS FOR ISOLATING FAULTS IN DIE-TO-DIE INTERCONNECTS

BACKGROUND

Die-to-die (D2D) interconnects are an integral aspect of advanced packaging technologies, including packaging technologies for integrating dies in 2.5D and 3D systems. Various types of die-to-die interconnect topologies and protocols are being implemented to address the need for higher bandwidth across such die-to-die interconnects. Example topologies of dies include 2.5D, 3D, and silicon bridge topologies. Example protocols for interconnecting the dies in such topologies include High Bandwidth Memory (HBM), Bunch Of Wires (BOW), Advance Interface Bus (AIB) and Universal Chiplet Interconnect Express (UCIE).

One common aspect associated with the different D2D topologies and the various protocols is the requirement for high-volume manufacturing tests to screen failures arising from physical defects in the die-to-die interconnects. Fault isolation methods are required to determine which die/interconnect is failing. Moreover, physical failure analysis is required to pinpoint the nature of the defect (e.g., open, shorts to supply voltage, shorts to ground, interconnect-coupling shorts). Physical failure analysis for chiplets and interconnects associated with advanced packaging topologies is becoming more complex and difficult to accomplish. As an example, certain stacked chiplets may even be physically inaccessible via common test and debug platforms.

Accordingly, there is a need for better systems and methods for isolating faults in die-to-die interconnects.

SUMMARY

In one example, the present disclosure relates to a system including a first die coupled to a second die via a die-to-die interconnect. The system may further include a first transmission path, along the die-to-die interconnect, from a transmitter associated with the first die to an asynchronous buffer associated with the second die.

The system may further include a second transmission path from voltage reference circuitry associated with the second die to the asynchronous buffer associated with the second die, where the voltage reference circuitry is configured to selectively output a first voltage or a second voltage, different from the first voltage. The system may further include control circuitry configured to simultaneously enable both the first transmission path and the second transmission path to allow the asynchronous buffer to receive inputs from both the transmitter associated with the first die and the voltage reference circuitry associated with the second die, where the inputs received by the asynchronous buffer are indicative of: (1) no failure in the die-to-die interconnect, (2) an open failure in the die-to-die interconnect, or (3) a short failure in the die-to-die interconnect.

In another example, the present disclosure relates to a method for isolating faults in a system comprising a first die coupled to a second die via a die-to-die interconnect. The method may include providing a first transmission path, along the die-to-die interconnect, from a transmitter associated with the first die to an asynchronous buffer associated with the second die.

The method may further include providing a second transmission path from voltage reference circuitry associated with the second die to the asynchronous buffer associated with the second die, where the voltage reference circuitry is configured to selectively output a first voltage or a second voltage, different from the first voltage. The method may further include simultaneously enabling both the first transmission path and the second transmission path to allow the asynchronous buffer to receive inputs from both the transmitter associated with the first die and the voltage reference circuitry associated with the second die, such that the inputs received by the asynchronous buffer are indicative of: (1) no failure in the die-to-die interconnect, (2) an open failure in the die-to-die interconnect, or (3) a short failure in the die-to-die interconnect.

In yet another example, the present disclosure relates to a system including a first die coupled to a second die via a first die-to-die interconnect and a second die-to-die interconnect. The system may further include a first transmission path, along the first die-to-die interconnect, from a first transmitter associated with the first die to a first asynchronous buffer associated with the first die. The system may further include a second transmission path, along the second die-to-die interconnect, from a second transmitter associated with the second die to a second asynchronous buffer associated with the second die.

The system may further include a third transmission path from first voltage reference circuitry associated with the first die to the first asynchronous buffer associated with the first die and a fourth transmission path from second voltage reference circuitry associated with the second die to the second asynchronous buffer associated with the second die, where each of the first voltage reference circuitry and the second voltage reference circuitry is configured to selectively output a first voltage or a second voltage, different from the first voltage. The system may further include control circuitry configured to simultaneously enable the first transmission path, the second transmission path, the third transmission path, and the fourth transmission path in order to detect any neighbor short between the first die-to-die interconnect and the second die-to-die interconnect based on inputs received by the first asynchronous buffer and the second asynchronous buffer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 10 shows a flow chart of an example method for isolating faults in an arrangement of dies comprising a first die coupled to a second die via a die-to-die interconnect.

DETAILED DESCRIPTION

Examples described in this disclosure relate to systems and methods for isolating faults in die-to-die interconnects. As noted earlier, die-to-die (D2D) interconnects are an integral aspect of advanced packaging technologies, including packaging technologies for integrating dies in 2.5D and 3D systems. As used herein the term "die" includes any block of material (e.g., semiconducting material) having integrated circuits, where the die can be packaged. The term die includes chiplets, which are typically smaller than a die. Various types of die-to-die interconnect topologies and protocols are being implemented to address the need for higher bandwidth across such die-to-die interconnects. Example topologies of dies include 2.5D, 3D, and silicon bridge topologies. Example protocols for interconnecting the dies in such topologies include High Bandwidth Memory (HBM), Bunch Of Wires (BOW), Advance Interface Bus (AIB) and Universal Chiplet Interconnect Express (UCIE).

As noted earlier, one common aspect associated with the different D2D topologies and the various protocols is the requirement for high-volume manufacturing tests to screen failures arising from physical defects in the die-to-die interconnects. Fault isolation methods are required to determine which die/interconnect is failing. Moreover, physical failure analysis has been required to pinpoint the nature of the defect (e.g., open, shorts to supply voltage, shorts to ground, interconnect-coupling shorts). Physical failure analysis for chiplets and interconnects associated with advanced packaging topologies is becoming more complex and difficult to accomplish. As an example, certain stacked chiplets may even be physically inaccessible via common test and debug platforms.

Accordingly, there is a need for better systems and methods for isolating faults in die-to-die interconnects, including probe-less systems and methods for isolating faults in die-to-die interconnects. The present disclosure describes a high-volume test and debug methodology for rapid diagnosis of physical faults in die-to-die interconnects associated with advanced packaging technologies.

Figure 1:
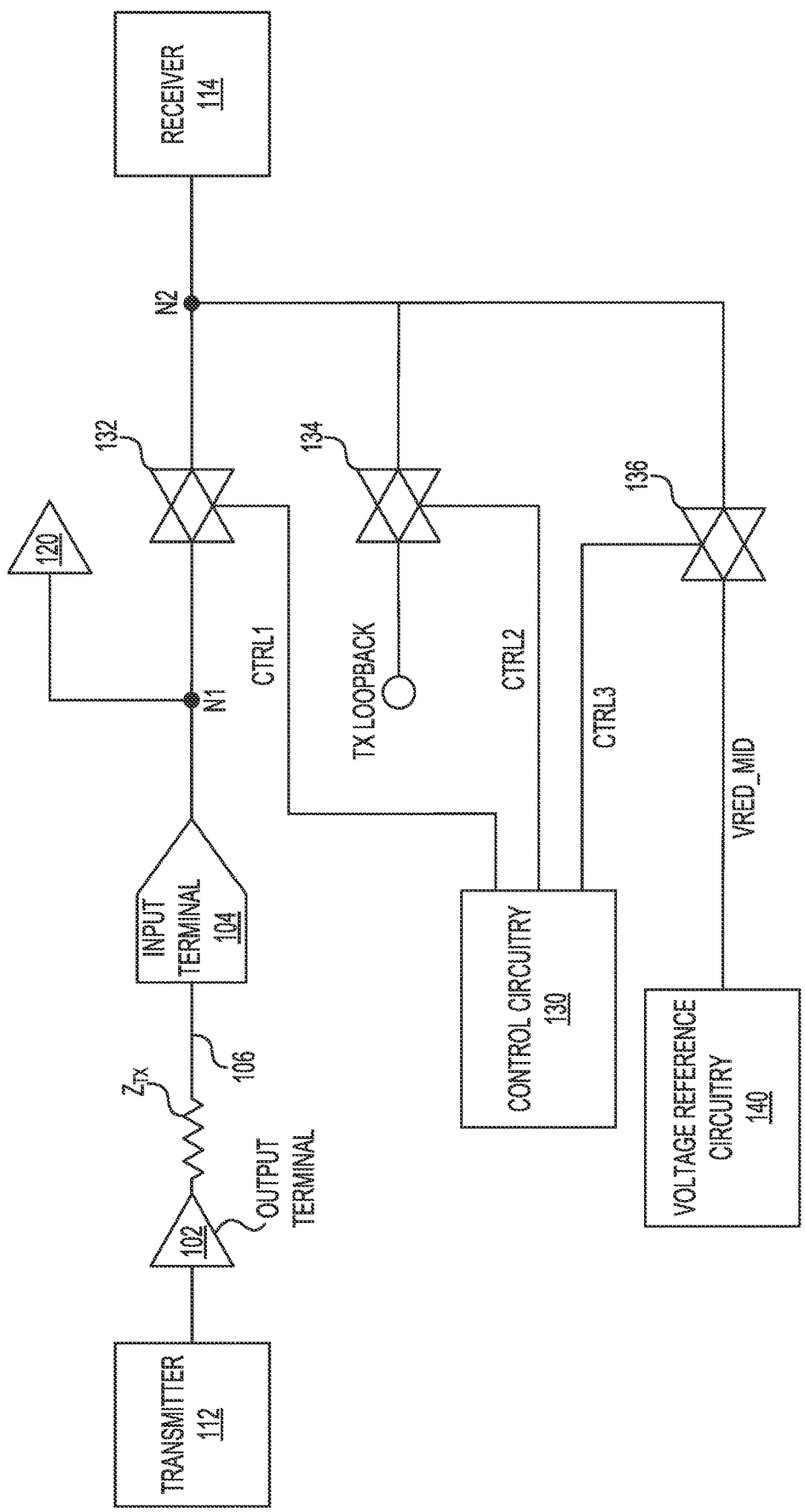
FIG. 1 shows a system for isolating faults in die-to-die interconnects in accordance with one example.

FIG. 1 shows a system 100 for isolating faults in die-to-die interconnects in accordance with one example. System 100 shows a die-to-die interconnect 106 that connects an output terminal 102 of an integrated circuit on a die to an input terminal 104 of another integrated circuit on a different die via a die-to-die interconnect 106. The die-to-die interconnect 106 may correspond to any one of a various type of interconnection structures, such as micro-bumps or hybrid bonds. System 100 includes a transmitter 112 that is formed as part of a die and a receiver that is also formed as part of the die. To illustrate the functionality of system 100, receiver 114 is described as being on a different die. Each die, however, will include both the transmitting side and the receiving side components. A transmission gate 132 is coupled to nodes N1 and N2 that are between transmitter 112 and receiver 114, such that the signals transmitted from transmitter 112 can only be received by receiver 114 when the transmission gate 132 is in a closed state.

With continued reference to FIG. 1, an asynchronous buffer 120 is coupled to the node N1. Asynchronous buffer 120 is a low-speed single ended asynchronous unidirectional input buffer. In one example, asynchronous buffer 120 may be implemented using flip-flops and associated logic gates. Asynchronous buffer 120 operates at a threshold voltage that is half of the supply voltage (e.g., VDD). Asynchronous buffer 120 is separate from any existing mission mode low swing high bandwidth die-to-die unidirectional transmit/receive path. Advantageously, asynchronous buffer 120 can also be used for low power communication while putting the high speed die-to-die input/output in a sleep state, saving power. Additional functionality of asynchronous buffer 120 for isolating faults in the die-to-die interconnects is described later.

System 100 further includes a transmission gate 134 and another transmission gate 136. Transmission gate 134 is coupled between a node labeled as TX LOOPBACK and the node N2. Transmission gate 136 is coupled between the node N2 and a voltage reference circuitry 140. Control circuitry 130 provides control signal CTRL1 for controlling the open/close state of transmission gate 132, control signal CTRL2 for controlling the open/close state of transmission gate 134, and control signal CTRL3 for controlling the open/close state of transmission gate 136. Control circuitry 130 may include finite state machines or other control logic responsive to test signals received from testing equipment.

Still referring to FIG. 1, voltage reference circuitry 140 is configured to provide specific capabilities for isolating faults in die-to-die interconnects that are beyond the reference voltage generation (typically in the form of a resistor ladder which has different tap points) used for calibration of the voltage reference circuitry for mission mode usage. In this example, the additional capabilities provided by voltage reference circuitry 140 include the provision of full-swing supply voltage (VDD) and the provision of 0 volts to allow open vs. short detection with ample margin. Moreover, voltage reference circuitry 140 includes the capability to allow one to disable the generation of these specific voltages (e.g., after system 100 has been used for isolating faults in the die-to-die interconnects).

By closing both transmission gates 132 and 136, the output voltage (VREF_MID) of voltage reference circuitry 140 is connected to the input of asynchronous buffer 120. At the same time, any input received via the input terminal 104, from transmitter 112, is also connected to the input of asynchronous buffer 120. In this manner, before the input received at the input terminal 104 reaches the input (node N2) of the receiver 114, it is shorted with the output from the voltage reference circuitry 140 to the input of asynchronous buffer 120. When the interconnect is open, the asynchronous buffer 120 will be connected to voltage reference circuitry 140, which generates the VDD voltage or the ground voltage. If there is an open failure, the input of asynchronous buffer (the node N1) will be coupled to receive the VDD voltage or the ground voltage from the voltage reference circuitry 140. On the other hand, if there is a short to ground failure, the input of asynchronous buffer 120 will be coupled to receive both the ground voltage (because of the short to the ground) and the VDD voltage or the ground voltage from the voltage reference circuitry 140. If there is a short to VDD voltage failure, the input of asynchronous buffer 120 will be coupled to receive both the VDD voltage (because of the short to VDD) and the VDD voltage or the ground voltage from the voltage reference circuitry 140. With the threshold of asynchronous buffer 120 set to VDD/2, there is plenty of noise margin to capture a true open failure or a true short failure. As explained further with respect to FIG. 2, the transmission impedance of transmitter 112 is low (e.g., approximately 60 ohms) while the impedance of voltage reference circuitry 140 is relatively high (e.g., approximately 1,000 ohms). As a result, asynchronous buffer 120 will capture the voltage swing (fault free, short to VDD, short to ground) coming from the interconnect itself even when two different inputs are coupled to asynchronous buffer 120. Advantageously, the input voltage swing of asynchronous buffer 120 is large enough, hence one need not worry about noise margin issues.

The signals for accomplishing fault isolation are driven using external test equipment (e.g., via the JTAG test interface). The inputs captured by asynchronous buffer 120 are sampled using an external tester (e.g., a JTAG test system). Advantageously, this obviates the need for the calibration of the phase-locked loop (PLL) and the analog transmitter/receiver associated with the mission mode components. Although FIG. 1 shows system 100 as having a certain number of components that are arranged in a certain manner, system 100 may include additional or fewer components that are arranged differently. As an example, system 100 may include control registers for specifying control options with respect to fault isolation.

Figure 2:
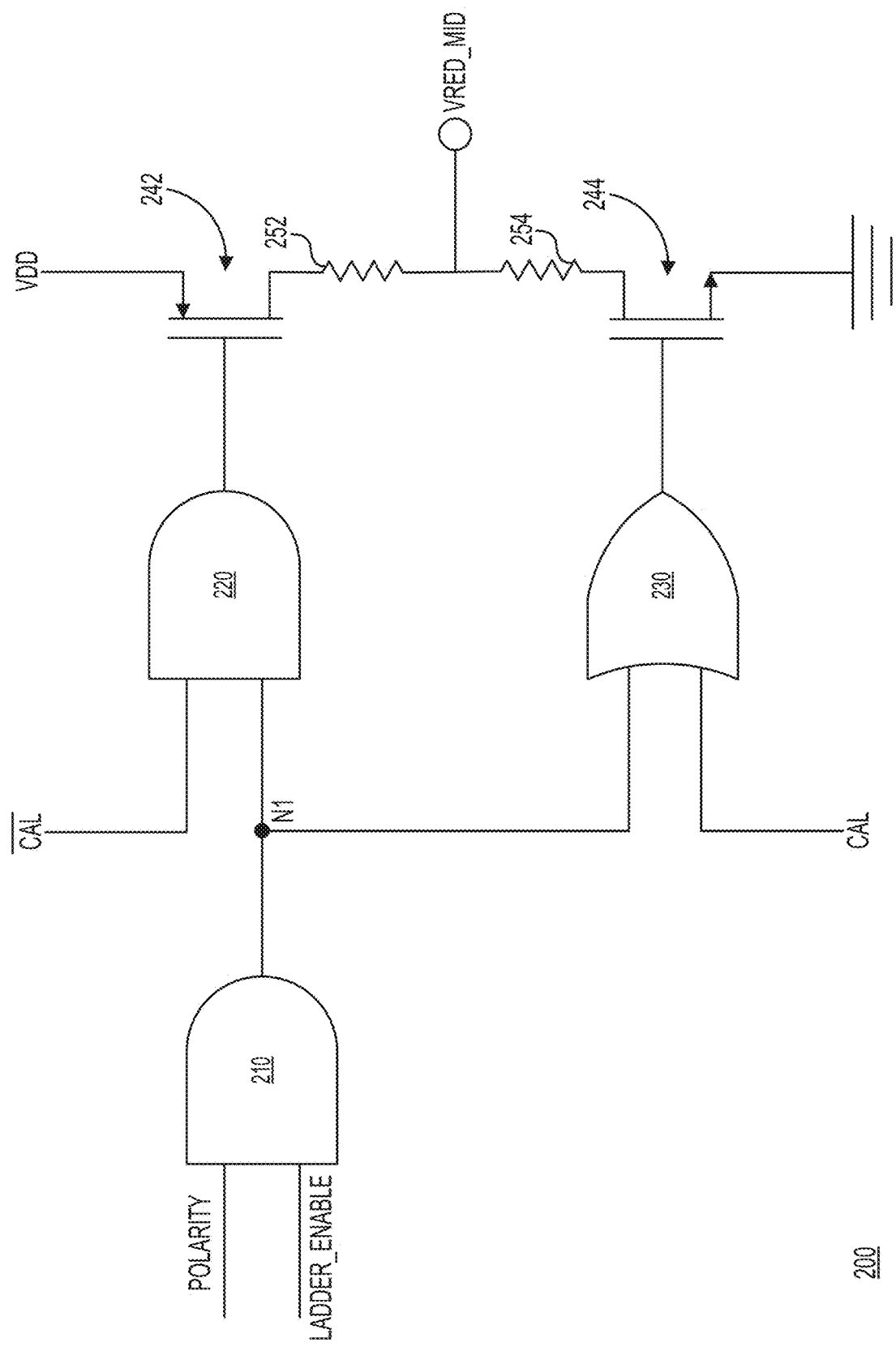
FIG. 2 shows example voltage reference circuitry for use with the system of FIG. 1.

FIG. 2 shows example voltage reference circuitry 200 for use with the system 100 of FIG. 1. Voltage reference circuitry 200 is one example implementation of voltage reference circuitry 140 of FIG. 1. Voltage reference circuitry 200 is configured to provide a voltage at the VREF_MID terminal based on control inputs, including the POLARITY signal, the LADDER_ENABLE signal, and the CAL signal. The CAL signal corresponds to the calibration signal and can be applied in an inverse form, as well. Voltage reference circuitry 200 includes an AND gate 210, which is coupled to receive two inputs: the POLARITY signal and the LADDER_ENABLE signal. AND gate 210 is further configured to output a signal at the N1 node. Voltage reference circuitry 200 further includes another AND gate 220, which is coupled to receive two inputs: the inverse of the CAL signal and the signal output by AND gate 210 at the node N1. Voltage reference circuitry 200 further includes an OR gate 230, which is coupled to receive two inputs: the CAL signal and the signal output by AND gate 210 at the node N1.

With continued reference to FIG. 2, voltage reference circuitry 200 further includes a PMOS transistor 242, whose gate is controlled by the output of the AND gate 220. The source of PMOS transistor 242 is coupled to receive the VDD voltage and the drain is coupled to one terminal of a resistor 252. The other terminal of resistor 252 is coupled to the VREF_MID terminal, which provides the voltage output by voltage reference circuitry 200. Voltage reference circuitry 200 further includes an NMOS transistor 244, whose gate is controlled by the output of the OR gate 230. The source of NMOS transistor 244 is coupled to one terminal of a resistor 254, whose other terminal is coupled to the VREF_MID terminal. The drain terminal of NMOS transistor 244 is coupled to receive the ground voltage via the ground terminal.

In terms of operation of the voltage reference circuitry 200, it provides an output via the VREF_MID terminal only when it is enabled via the LADDER_ENABLE signal. Thus, when the LADDER_ENABLE signal is a logic high, the voltage reference circuitry can selectively provide either the VDD voltage as an output at the VREF_MID terminal or the ground voltage as the output at the VREF_MID terminal. The selection between which one of these voltages is provided, in part, depends on the state of the POLARITY signal and the state of the CAL signal. As an example, when the POLARITY signal is high, and the CAL signal is low then the VDD voltage is provided via the VREF_MID terminal. Alternatively, when the POLARITY signal is high, and the CAL signal is low then the ground voltage is provided at the VREF_MID terminal. The use of the voltage reference circuitry 200 in the context of system 100 is further explained with respect to the various testing scenarios for testing the die-to-die interconnects.

As explained earlier with respect to FIG. 1, the transmission impedance of transmitter 112 is low (e.g., approximately 60 ohms) while the impedance of voltage reference circuitry 140 (implemented as voltage reference circuitry 200) is relatively high (e.g., approximately 1,000 ohms). In this example, each of the resistor 252 and resistor 254 may have a resistance of approximately 1,000 ohms. As a result, asynchronous buffer 120 of FIG. 1 will capture the voltage swing (fault free, short to VDD, short to ground) coming from the interconnect itself even when two different inputs are coupled to asynchronous buffer 120. Although FIG. 2 shows voltage reference circuitry 200 as having a certain number of components that are arranged in a certain manner, voltage reference circuitry 200 may include additional or fewer components that are arranged differently.

Figure 3:
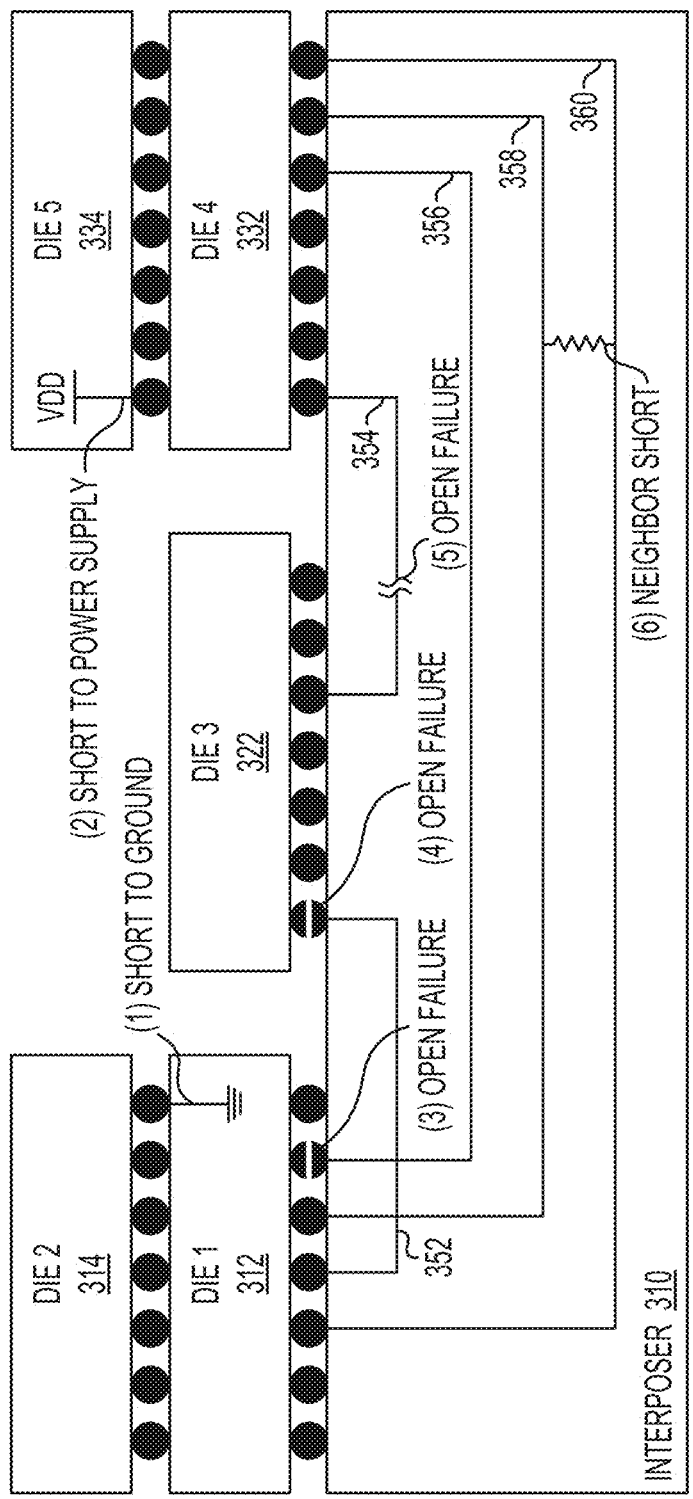
FIG. 3 shows an example stacked arrangement of dies with examples of faults in the die-to-die interconnects that can be isolated.

FIG. 3 shows an example stacked arrangement of dies 300 with examples of faults in the die-to-die interconnects that can be isolated. Stacked arrangement of dies 300 includes several dies (including chiplets), stacked on top of an interposer 310. In this example, die 1 312 is stacked on top of interposer 310. Die 2 314 is stacked on top of die 1 312. Die 3 322 is stacked on top of interposer 310. Die 4 332 is stacked on top of interposer 310. Die 5 334 is stacked on top of die 4 332. The dies may be connected to the interposer 310 via micro-bumps or another type of connection structure. Dies may also be connected to each other via micro-bumps, hybrid bonds, or another type of connection structure. Wires (e.g., wires 352, 354, 356, 358, and 360) within interposer 310 are used to provide interconnections among at least some of the dies. In the present disclosure, regardless of whether micro-bumps, hybrid bonds, or another connection structure is used, a connection between a die and another die, or a connection between a die and the interposer is referred to as a die-to-die interconnect.

With continued reference to FIG. 3, the stacked arrangement of dies 300 is used to illustrate the various types of faults in die-to-die interconnects that could be isolated using system 100. Components associated with system 100 may be included in each of the dies, as required for testing. The various fault scenarios shown in FIG. 3 include: (1) a short to ground (e.g., VSS), (2) a short to power supply (e.g., VDD), (3) an open failure, (4) another open failure, (5) yet another open failure, and (6) a neighbor short (showing a short between wires 358 and 360). Other faults that are not shown may occur, as well. Although FIG. 3 shows a stacked arrangement of dies, the dies need not be stacked. As an example, two dies may be arranged on top of an interposer.

Using system 100, without any physical failure analysis, five different production tests are sufficient to isolate the presence of an open or a short in an interconnect. Table 1 below illustrates the fault free case. This table shows the transmission of various values from the transmitting asynchronous buffer (e.g., included in transmitter 112 of FIG. 1), the output of the VDD voltage or the ground voltage (0 volts) (e.g., by the voltage reference circuitry 140 of FIG. 1), and the input capture by the asynchronous buffer (e.g., asynchronous buffer 120 of FIG. 1).

TABLE 1

| Transmitter Async Output | VREF_MID Setting | Receiver Async Capture |
|---|---|---|
| Transmit 0 via Async Output | Output the VDD voltage via the voltage reference circuitry | Async Input Capture = 0 |
| Transmit 0 via Async Output | Output the ground voltage via the voltage reference circuitry | Async Input Capture = 0 |
| Transmit 1 via Async Output | Output the VDD voltage via the voltage reference circuitry | Async Input Capture = 1 |
| Transmit 1 via Async Output | Output the ground voltage via the voltage reference circuitry | Async Input Capture = 1 |

Figure 4:
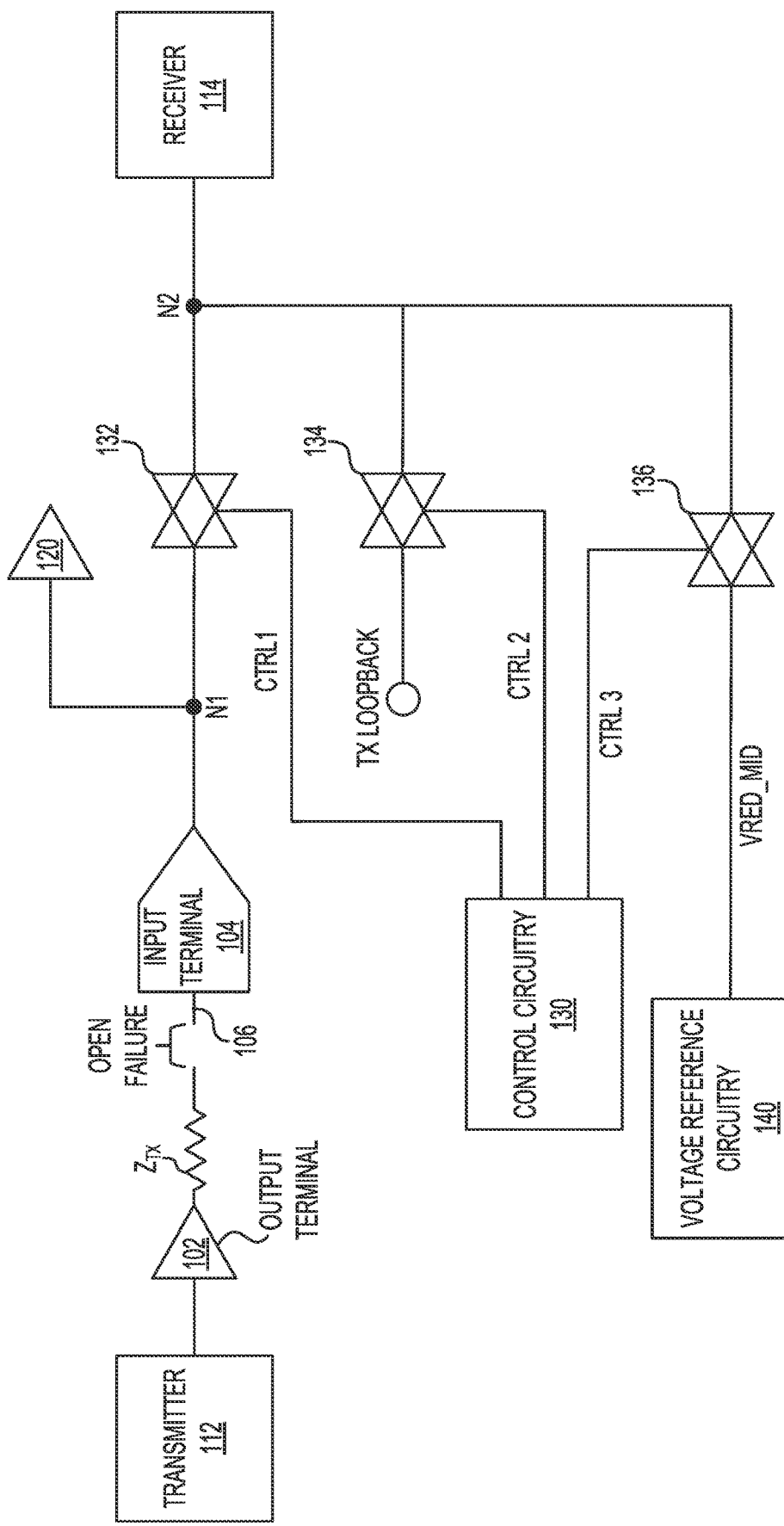
FIG. 4 shows an operational arrangement of the system of FIG. 1 for isolating open faults in accordance with one example.

FIG. 4 shows an operational arrangement 400 of the system of FIG. 1 for isolating open faults in accordance with one example. The same or similar components that are shown in FIG. 4 are referred to using the same reference numbers as used in FIG. 1. Operational arrangement 400 shows an open failure in the die-to-die interconnect 106 that connects the output terminal 102 of an integrated circuit on a die to the input terminal 104 of another integrated circuit on a different die. As part of the operational arrangement 400, both transmission gates 132 and 136 are closed, and thus the output voltage (VREF_MID) of the voltage reference circuitry 140 is connected to the input of asynchronous buffer 120. At the same time, any input received via the input terminal 104, from transmitter 112, is also connected to the input of asynchronous buffer 120. When the interconnect is open, the asynchronous buffer 120 will be connected to voltage reference circuitry 140, which generates the VDD voltage or the ground voltage. Table 2 below illustrates the open fault case, which corresponds to fault scenarios 3, 4, and 5 described with respect to FIG. 3. This table shows the transmission of various values from the transmitting asynchronous buffer (e.g., included in transmitter 112 of FIG. 1), the output of the VDD voltage or the ground voltage (0 volts) (e.g., by the voltage reference circuitry 140 of FIG. 1), and the input capture by the asynchronous buffer (e.g., asynchronous buffer 120 of FIG. 1).

TABLE 2

| Transmitter Async Output | VREF_MID Setting | Receiver Async Capture |
|---|---|---|
| Transmit 0 via Async Output | Output the VDD voltage via the voltage reference circuitry | Async Input Capture = 1 |
| Transmit 0 via Async Output | Output the ground voltage via the voltage reference circuitry | Async Input Capture = 0 |
| Transmit 1 via Async Output | Output the VDD voltage via the voltage reference circuitry | Async Input Capture = 1 |
| Transmit 1 via Async Output | Output the ground voltage via the voltage reference circuitry | Async Input Capture = 0 |

Figure 5:
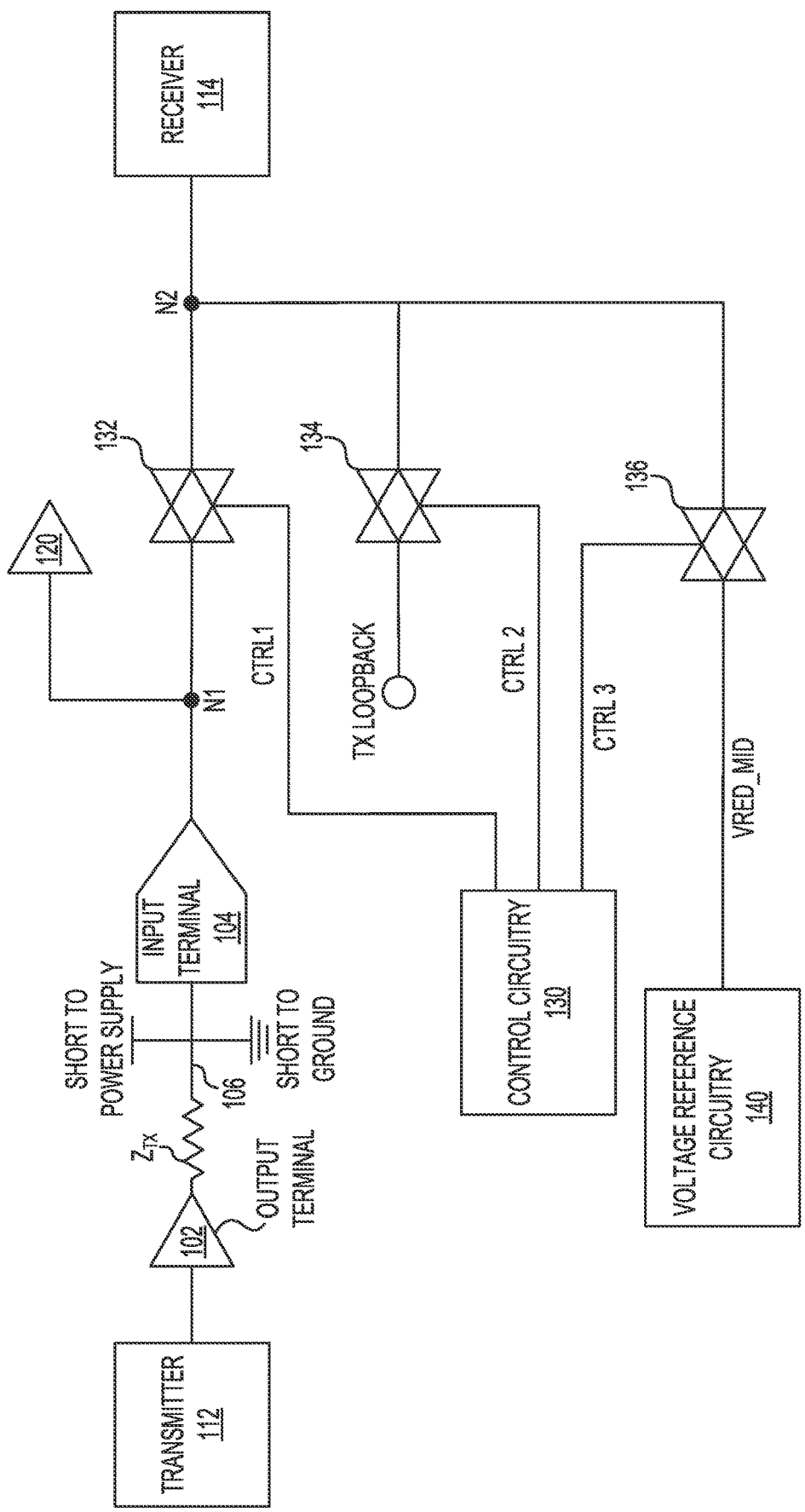
FIG. 5 shows an operational arrangement of the system of FIG. 1 for isolating short faults in accordance with one example.

FIG. 5 shows an operational arrangement 500 of the system of FIG. 1 for isolating short faults in accordance with one example. The same or similar components that are shown in FIG. 5 are referred to using the same reference numbers as used in FIG. 1. As part of the operational arrangement 500, both transmission gates 132 and 136 are closed, and thus the output voltage (VREF_MID) of the voltage reference circuitry 140 is connected to the input of asynchronous buffer 120. At the same time, any input received via the input terminal 104, from transmitter 112, is also connected to the input of asynchronous buffer 120. When the interconnect is shorted to power supply (e.g., VDD), the asynchronous buffer 120 captures the logic high value even though the asynchronous buffer 120 will also be connected to voltage reference circuitry 140, which generates the VDD voltage or the ground voltage. Table 3 below illustrates the short to the power supply case, which corresponds to fault scenario 2 described with respect to FIG. 3. This table shows the transmission of various values from the transmitting asynchronous buffer (e.g., included in transmitter 112 of FIG. 1), the output of the VDD voltage or the ground voltage (0 volts) (e.g., by the voltage reference circuitry 140 of FIG. 1), and the input capture by the asynchronous buffer (e.g., asynchronous buffer 120 of FIG. 1). As shown in Table 3 below, regardless of the values output by the voltage reference circuitry 140 of FIG. 1, the asynchronous buffer 120 captures the VDD value because of the short to VDD between the transmitter and the receiver.

TABLE 3

| Transmitter Async Output | VREF_MID Setting | Receiver Async Capture |
|---|---|---|
| Transmit 0 via Async Output | Output the VDD voltage via the voltage reference circuitry | Async Input Capture = 1 |
| Transmit 0 via Async Output | Output the ground voltage via the voltage reference circuitry | Async Input Capture = 1 |
| Transmit 1 via Async Output | Output the VDD voltage via the voltage reference circuitry | Async Input Capture = 1 |
| Transmit 1 via Async Output | Output the ground voltage via the voltage reference circuitry | Async Input Capture = 1 |

Table 4 below illustrates the short to the ground case, which corresponds to fault scenario 1 described with respect to FIG. 3. This table shows the transmission of various values from the transmitting asynchronous buffer (e.g., included in transmitter 112 of FIG. 1), the output of the VDD voltage or the ground voltage (0 volts) (e.g., by the voltage reference circuitry 140 of FIG. 1), and the input capture by the asynchronous buffer (e.g., asynchronous buffer 120 of FIG. 1). As shown in Table 4 below, regardless of the values output by the voltage reference circuitry 140 of FIG. 1, the asynchronous buffer 120 captures the ground voltage (0 value) because of the short to ground between the transmitter and the receiver.

TABLE 4

| Transmitter Async Output | VREF_MID Setting | Receiver Async Capture |
|---|---|---|
| Transmit 0 via Async Output | Output the VDD voltage via the voltage reference circuitry | Async Input Capture = 0 |
| Transmit 0 via Async Output | Output the ground voltage via the voltage reference circuitry | Async Input Capture = 0 |

TABLE 4-continued

| Transmitter Async Output | VREF_MID Setting | Receiver Async Capture |
|---|---|---|
| Transmit 1 via Async Output | Output the VDD voltage via the voltage reference circuitry | Async Input Capture = 0 |
| Transmit 1 via Async Output | Output the ground voltage via the voltage reference circuitry | Async Input Capture = 0 |

Figure 6:
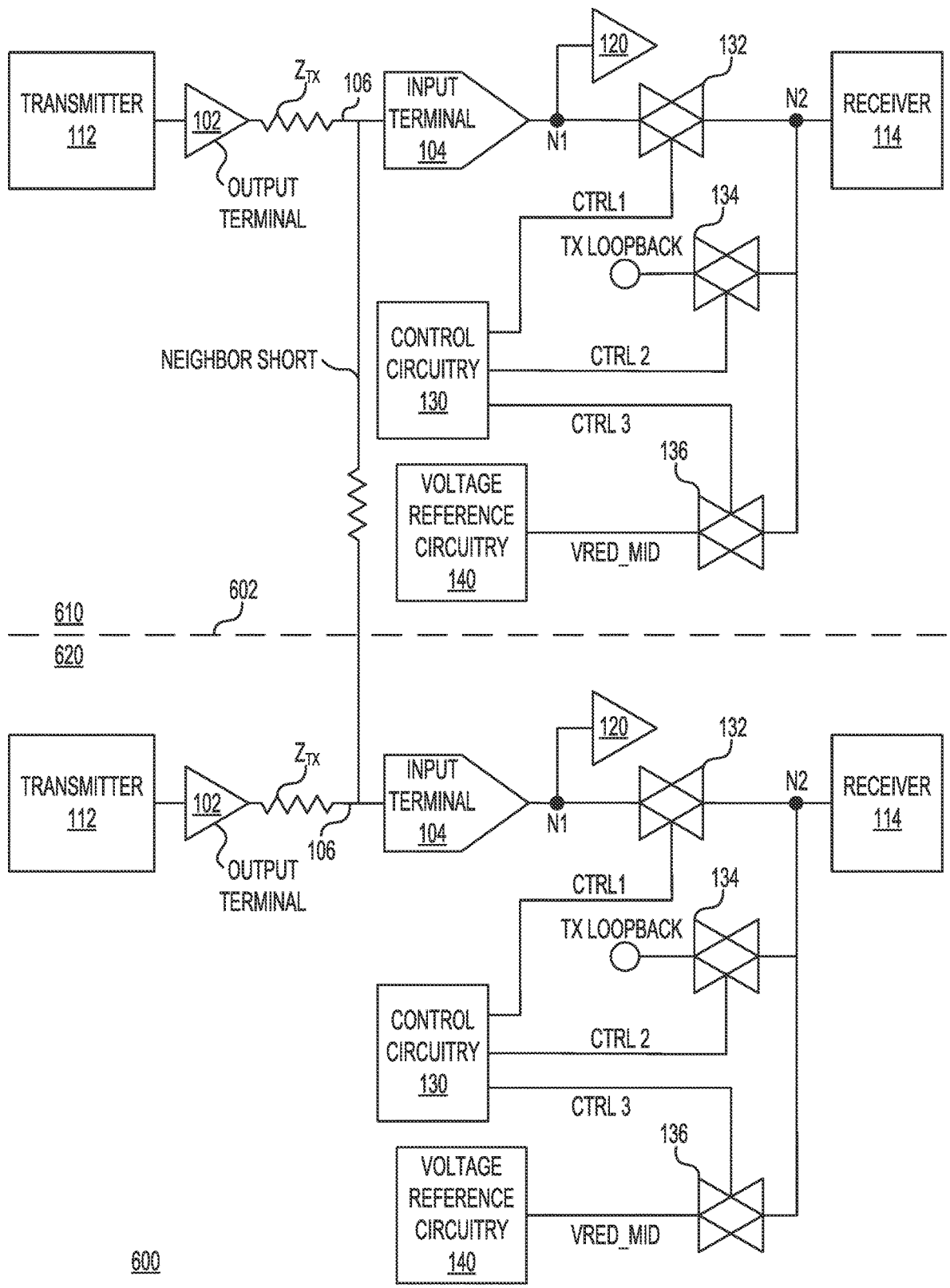
FIG. 6 shows an operational arrangement of the system of FIG. 1 for isolating neighbor short faults in accordance with one example.

FIG. 6 shows an operational arrangement 600 of system 100 of FIG. 1 for isolating neighbor short faults in accordance with one example. The same or similar components that are shown in FIG. 6 are referred to using the same reference numbers as used in FIG. 1. As part of the operational arrangement 600, two system instances 610 and 620 (separated by dotted line 602) of system 100 of FIG. 1 are shown. A neighbor short fault is shown, which results in the transmitter 112 of system instance 610 driving the data on die-to-die interconnect 106 for system instance 620. As part of this system arrangement, for each of system instance 610 and system instance 620, both transmission gates 132 and 136 are closed, and thus the output voltage (VREF_MID) of the voltage reference circuitry 140 is connected to the input of asynchronous buffer 120. At the same time, any input received via the input terminal 104, from transmitter 112, of each of the system instances 610 and 620 is also connected to the input of asynchronous buffer 120. When the neighboring interconnects are shorted, transmitter 112 of system instance 610 ends up driving die-to-die interconnect 106 of system instance 620. Table 5 below illustrates the neighbor short case, which corresponds to fault scenario 6 described with respect to FIG. 3. This table shows the transmission of various values from the transmitting asynchronous buffer (e.g., included in transmitter 112 of system instance 610) and the capture by the asynchronous buffers of both system instances 610 and 620.

TABLE 5

| Transmitter Async Output | VREF_MID Setting | Receiver Async Capture |
|---|---|---|
| Transmit 0 via Async Output | Output the VDD voltage via the voltage reference circuitry | Async Input Capture = 0 for both |
| Transmit 0 via Async Output | Output the ground voltage via the voltage reference circuitry | Async Input Capture = 0 for both |
| Transmit 1 via Async Output | Output the VDD voltage via the voltage reference circuitry | Async Input Capture = 1 for both |
| Transmit 1 via Async Output | Output the ground voltage via the voltage reference circuitry | Async Input Capture = 1 for both |

Software instructions can be programmed for the test apparatus to decode the results from each of the tests performed as part of Tables 1-5. In sum, by testing in this manner the types of die-to-die interconnect faults described earlier can be quickly and reliably isolated.

Figure 7:
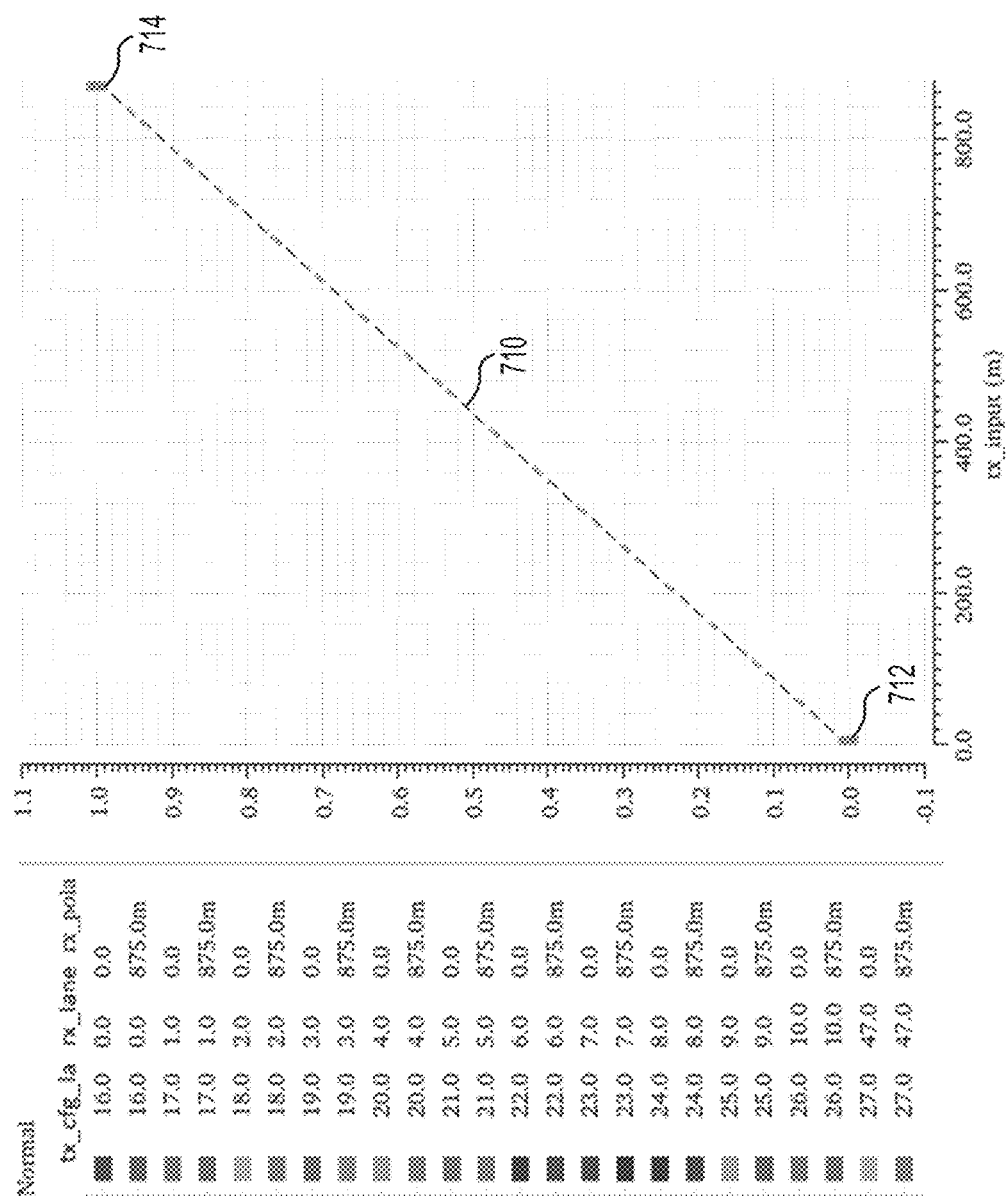
FIG. 7 shows a simulated graph for the system of FIG. 1 in which the die-to-die interconnect under test has no faults.

FIG. 7 shows a simulated graph 700 for system 100 of FIG. 1 in which the die-to-die interconnect under test has no faults. The horizontal axis of simulated graph 700 shows the voltage values (millivolts) of the transmitted data from the asynchronous buffer associated with the transmitter (e.g., transmitter 112 of system 100 of FIG. 1). The vertical axis of simulated graph 700 shows the voltage values corresponding to the inputs captured by the asynchronous buffer (e.g., asynchronous buffer 120 of system 100 of FIG. 1). As shown by dotted line 710, since the die-to-die interconnect has no faults, the captured data follows the transmitted data from the transmitter (e.g., transmitter 112 of system 100 of FIG. 1). One end 712 of the dotted line 710 corresponds to the ground voltage and the other end 714 of the dotted line 710 corresponds to the power supply voltage. Although simulated graph 700 shows certain specific voltage ranges, the applicability of system 100 of FIG. 1 and the related methods is not limited to these specific ranges.

Figure 8:
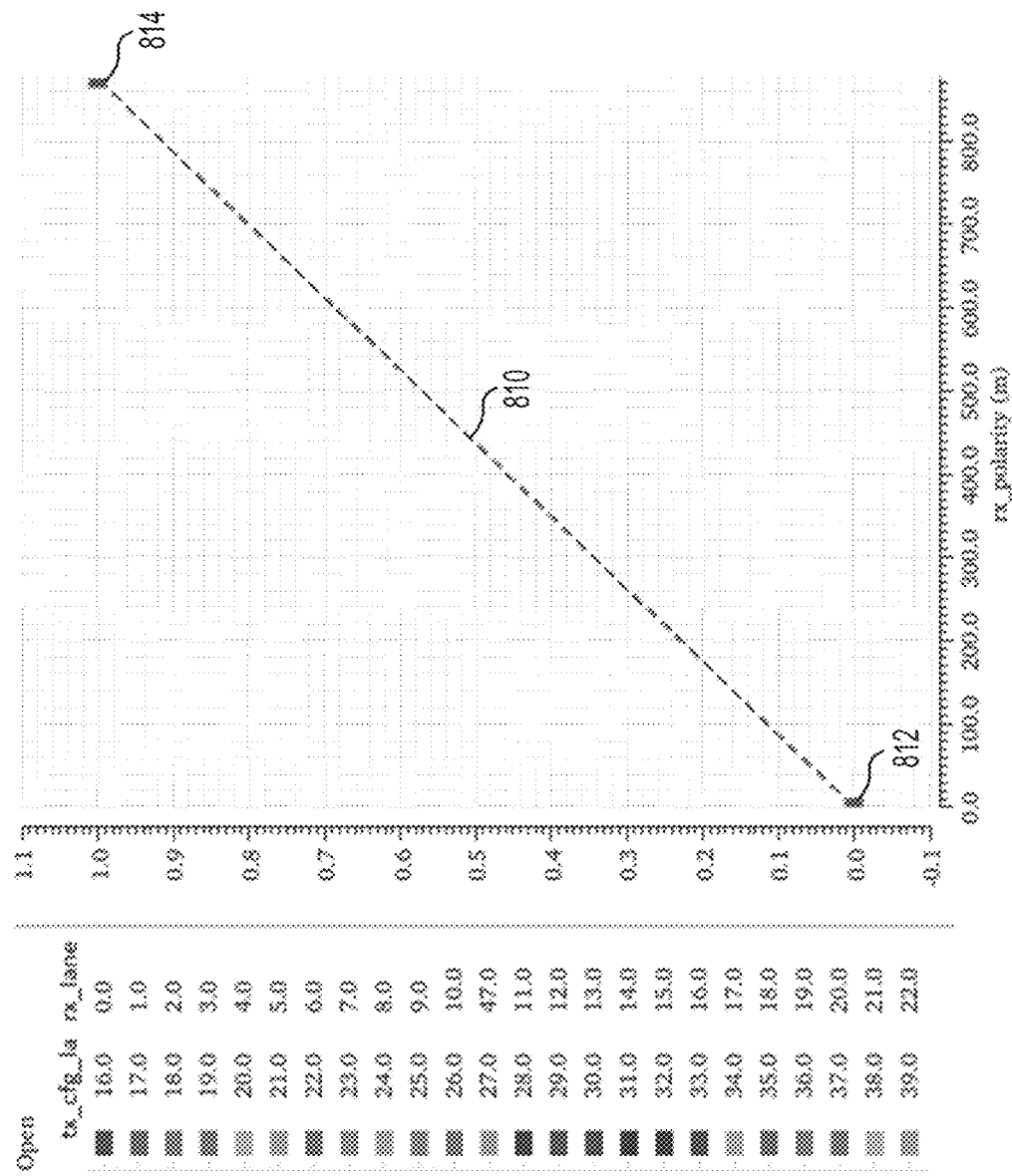
FIG. 8 shows a simulated graph for the system of FIG. 1 in which the die-to-die interconnect under test has open failures.

FIG. 8 shows a simulated graph 800 for system 100 of FIG. 1 in which the die-to-die interconnect under test has open failures. The horizontal axis of simulated graph 700 shows the voltage values (millivolts) output by the voltage reference circuitry (e.g., voltage reference circuitry 140 of system 100 of FIG. 1) in response to the polarity control. The vertical axis of simulated graph 700 shows the voltage values corresponding to the inputs captured by the asynchronous buffer (e.g., asynchronous buffer 120 of system 100 of FIG. 1). As shown by dotted line 810, since the die-to-die interconnect has an open fault, the captured data does not follow the transmitted data from the transmitter (e.g., transmitter 112 of system 100 of FIG. 1). Instead, the captured data follows the values received from the voltage reference circuitry. One end 812 of the dotted line 810 corresponds to the ground voltage and the other end 814 of the dotted line 810 corresponds to the power supply voltage. Although simulated graph 800 shows certain specific voltage ranges, the applicability of system 100 of FIG. 1 and the related methods is not limited to these specific ranges.

Figure 9:
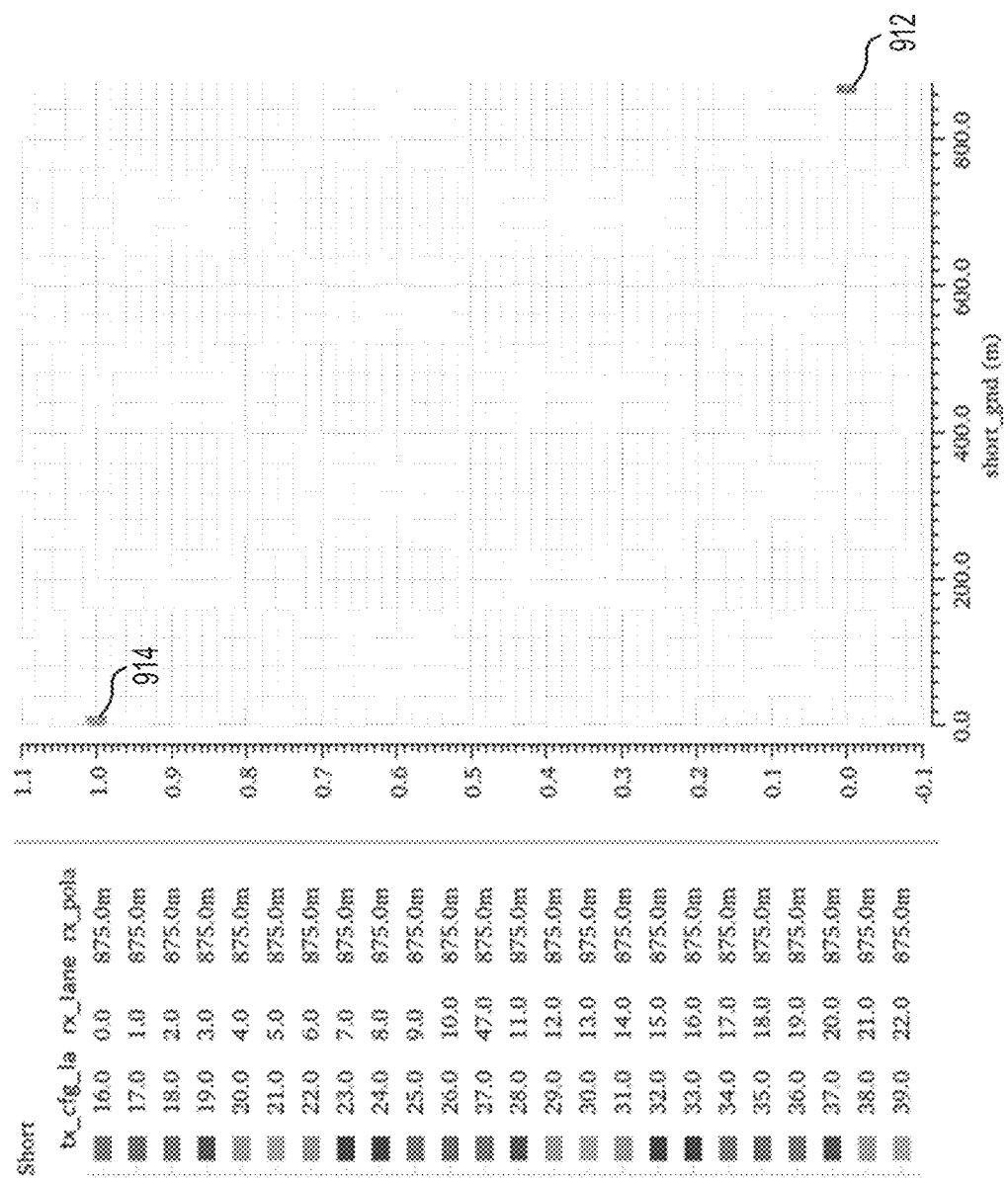
FIG. 9 shows a simulated graph for the system of FIG. 1 in which the die-to-die interconnect under test has either a short to the ground or a short to the power supply.

FIG. 9 shows a simulated graph 900 for system 100 of FIG. 1 in which the die-to-die interconnect under test has either a short to the ground or a short to the power supply. The horizontal axis of simulated graph 900 shows the voltage values (millivolts) output by the voltage reference circuitry (e.g., voltage reference circuitry 140 of system 100 of FIG. 1) in response to the polarity control. The vertical axis of simulated graph 900 shows the voltage values corresponding to the inputs captured by the asynchronous buffer (e.g., asynchronous buffer 120 of system 100 of FIG. 1). In this case, the transmitter (e.g., transmitter 112 of system 100 of FIG. 1) is either pulled to ground (e.g., in a short to the ground failure scenario) or is pulled to the power supply voltage (e.g., in a short to the power supply failure scenario). Accordingly, the captured data by the asynchronous buffer (e.g., asynchronous buffer 120 of system 100 of FIG. 1) is either a logic high or a logic low regardless of the values provided by the voltage reference circuitry (e.g., voltage reference circuitry 140 of system 100 of FIG. 1). As part of simulated graph 900, the output in case of a short to the ground is identified by the reference number 912 and the output in case of a short to the power supply is identified by the reference number 914. Although simulated graph 900 shows certain specific voltage ranges, the applicability of system 100 of FIG. 1 and the related methods is not limited to these specific ranges.

FIG. 10 shows a flow chart 1000 of an example method for isolating faults in an arrangement of dies comprising a first die coupled to a second die via a die-to-die interconnect. In this example, this method may be performed using system 100 of FIG. 1. Step 1010 may include providing a first transmission path, along the die-to-die interconnect, from a transmitter associated with the first die to an asynchronous buffer associated with the second die. In this example, the first transmission path includes the path from transmitter 112 of system 100 of FIG. 1 to asynchronous buffer 120 of system 100 of FIG. 1.

Step 1020 may include providing a second transmission path from voltage reference circuitry associated with the second die to the asynchronous buffer associated with the second die, where the voltage reference circuitry is configured to selectively output a first voltage or a second voltage, different from the first voltage. In this example, the second transmission path includes the path from voltage reference circuitry 140 of system 100 of FIG. 1 to asynchronous buffer 120 of system 100 of FIG. 1. As explained earlier with respect to system 100 of FIG. 1, voltage reference circuitry 140 can selectively output both the power supply voltage and the ground voltage.

Step 1030 may include simultaneously enabling both the first transmission path and the second transmission path to allow the asynchronous buffer to receive inputs from both the transmitter associated with the first die and the voltage reference circuitry associated with the second die, such that the inputs received by the asynchronous buffer are indicative of: (1) no failure in the die-to-die interconnect, (2) an open failure in the die-to-die interconnect, or (3) a short failure in the die-to-die interconnect. As explained earlier with respect to system 100 of FIG. 1, by closing both transmission gates 132 and 136, the output voltage (VREF_MID) of voltage reference circuitry 140 is connected to the input of asynchronous buffer 120. At the same time, any input received via the input terminal 104, from transmitter 112, is also connected to the input of asynchronous buffer 120. In this manner, before the input received at the input terminal 104 reaches the input (node N2) of the receiver 114, it is shorted with the output from the voltage reference circuitry 140 to the input of asynchronous buffer 120. In sum, both the first transmission path and the second transmission path are enabled at the same time.

The various inputs captured by the asynchronous buffer for fault isolation are described with respect to FIGS. 1-6 and tables 1-5. As explained earlier, the captured inputs can be decoded using test equipment to isolate the various faults in the die-to-die interconnects. Although FIG. 10 describes the steps in a certain order, they need not be performed in this order.

The systems and methods for fault isolation described herein provide several advantages. Using the systems and methods described herein one can pinpoint if the interconnect failure is due to an open or a short during production tests without relying on physical failure analysis. In addition, one can narrow the specific failure identified via fault isolation down to a specific die and a specific interconnect lane. Each type of the interconnect failure illustrated with respect to FIG. 3 can be isolated. Moreover, the use of the systems and methods described herein does not require one to activate the phase locked loop (PLL) and the high-speed transmitter and the high-speed receiver, saving power. A user can set a few registers and evaluate a few bits captured by the asynchronous buffer to determine if the output is toggling as expected. Moreover, no analog calibration of the transmitter or the receiver is needed.

In addition, the testing is independent of the firmware or the boot sequence associated with the system being tested. The fault isolation system is also scalable and can be applied to the various die-to-die protocols noted earlier. The fault isolation system can be used to isolate faults in die-to-die interconnects that are used for transmitting/receiving data or for other functions, such as clocking, control/command, and power management.

In conclusion, the present disclosure relates to a system including a first die coupled to a second die via a die-to-die interconnect. The system may further include a first transmission path, along the die-to-die interconnect, from a transmitter associated with the first die to an asynchronous buffer associated with the second die.

The system may further include a second transmission path from voltage reference circuitry associated with the second die to the asynchronous buffer associated with the second die, where the voltage reference circuitry is configured to selectively output a first voltage or a second voltage, different from the first voltage. The system may further include control circuitry configured to simultaneously enable both the first transmission path and the second transmission path to allow the asynchronous buffer to receive inputs from both the transmitter associated with the first die and the voltage reference circuitry associated with the second die, where the inputs received by the asynchronous buffer are indicative of: (1) no failure in the die-to-die interconnect, (2) an open failure in the die-to-die interconnect, or (3) a short failure in the die-to-die interconnect.

The inputs received by the asynchronous buffer are indicative of no failure in the die-to-die interconnect when the inputs correspond to the inputs received via the first transmission path. The inputs received by the asynchronous buffer are indicative of the open failure when the inputs correspond to the inputs received via the second transmission path. The first transmission path has a lower impedance than the second transmission path.

The asynchronous buffer may be a single-ended unidirectional buffer. The asynchronous buffer may have a threshold voltage amount equal to or less than half of a power supply voltage for the second die.

The second die may comprise a receiver, and during fault isolation any inputs received at an input terminal associated with the second die are shorted with any inputs received from the voltage reference circuitry to an input terminal of the asynchronous buffer. The first voltage may correspond to a supply voltage associated with the second die and the second voltage may correspond to a ground voltage associated with the second die.

In another example, the present disclosure relates to a method for isolating faults in a system comprising a first die coupled to a second die via a die-to-die interconnect. The method may include providing a first transmission path, along the die-to-die interconnect, from a transmitter associated with the first die to an asynchronous buffer associated with the second die.

The method may further include providing a second transmission path from voltage reference circuitry associated with the second die to the asynchronous buffer associated with the second die, where the voltage reference circuitry is configured to selectively output a first voltage or a second voltage, different from the first voltage. The method may further include simultaneously enabling both the first transmission path and the second transmission path to allow the asynchronous buffer to receive inputs from both the transmitter associated with the first die and the voltage reference circuitry associated with the second die, such that the inputs received by the asynchronous buffer are indicative of: (1) no failure in the die-to-die interconnect, (2) an open failure in the die-to-die interconnect, or (3) a short failure in the die-to-die interconnect.

The asynchronous buffer may be a single-ended unidirectional buffer. The asynchronous buffer may have a threshold voltage amount equal to or less than half of a power supply voltage for the second die. The first transmission path may have a lower impedance than the second transmission path.

The second die may comprise a receiver, and during fault isolation any inputs received at an input terminal associated with the second die are shorted with any inputs received from the voltage reference circuitry to an input terminal of the asynchronous buffer. The first voltage may correspond to a supply voltage associated with the second die and the second voltage may correspond to a ground voltage associated with the second die.

In yet another example, the present disclosure relates to a system including a first die coupled to a second die via a first die-to-die interconnect and a second die-to-die interconnect. The system may further include a first transmission path, along the first die-to-die interconnect, from a first transmitter associated with the first die to a first asynchronous buffer associated with the first die. The system may further include a second transmission path, along the second die-to-die interconnect, from a second transmitter associated with the second die to a second asynchronous buffer associated with the second die.

The system may further include a third transmission path from first voltage reference circuitry associated with the first die to the first asynchronous buffer associated with the first die and a fourth transmission path from second voltage reference circuitry associated with the second die to the second asynchronous buffer associated with the second die, where each of the first voltage reference circuitry and the second voltage reference circuitry is configured to selectively output a first voltage or a second voltage, different from the first voltage. The system may further include control circuitry configured to simultaneously enable the first transmission path, the second transmission path, the third transmission path, and the fourth transmission path in order to detect any neighbor short between the first die-to-die interconnect and the second die-to-die interconnect based on inputs received by the first asynchronous buffer and the second asynchronous buffer.

Each of the first asynchronous buffer and the second asynchronous buffer may be a single-ended unidirectional buffer. Each of the first asynchronous buffer and the second asynchronous buffer may have a threshold voltage amount equal to or less than half of a power supply voltage for each of the first die and the second die. The first transmission path may have a lower impedance than the third transmission path and the second transmission path may have a lower impedance than the fourth transmission path.

The first voltage may correspond to a supply voltage associated with each of the first die and the second die and the second voltage may correspond to a ground voltage associated with teach of the first die and the second die. The control circuitry may further be configured to enable combinations of the first transmission path, the second transmission path, the third transmission path, and the fourth transmission path in order to detect: (1) no failure in the first die-to-die interconnect or the second die-to-die interconnect, (2) an open failure in the first die-to-die interconnect or the second die-to-die interconnect, or (3) a short failure in the first die-to-die interconnect or the second die-to-die interconnect based on inputs received by the first asynchronous buffer or the second asynchronous buffer.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A system comprising:
   a first die coupled to a second die via a die-to-die interconnect;
   a first transmission path, along the die-to-die interconnect, from a transmitter associated with the first die to an asynchronous buffer associated with the second die;
   a second transmission path from voltage reference circuitry associated with the second die to the asynchronous buffer associated with the second die, wherein the voltage reference circuitry is configured to selectively output a first voltage or a second voltage, different from the first voltage; and
   control circuitry configured to simultaneously enable both the first transmission path and the second transmission path to allow the asynchronous buffer to receive inputs from both the transmitter associated with the first die and the voltage reference circuitry associated with the second die, wherein the inputs received by the asynchronous buffer are indicative of: (1) no failure in the die-to-die interconnect, (2) an open failure in the die-to-die interconnect, or (3) a short failure in the die-to-die interconnect.

2. The system of claim 1, wherein the inputs received by the asynchronous buffer are indicative of no failure in the die-to-die interconnect when the inputs correspond to the inputs received via the first transmission path.

3. The system of claim 1, wherein the inputs received by the asynchronous buffer are indicative of the open failure when the inputs correspond to the inputs received via the second transmission path.

4. The system of claim 1, wherein the asynchronous buffer is a single-ended unidirectional buffer.

5. The system of claim 1, wherein the asynchronous buffer has a threshold voltage amount equal to or less than half of a power supply voltage for the second die.

6. The system of claim 1, wherein the second die comprises a receiver, and wherein during fault isolation any inputs received at an input terminal associated with the second die are shorted with any inputs received from the voltage reference circuitry to an input terminal of the asynchronous buffer.

7. The system of claim 1, wherein the first voltage corresponds to a supply voltage associated with the second die, and wherein the second voltage corresponds to a ground voltage associated with the second die.

8. The system of claim 1, wherein the first transmission path has a lower impedance than the second transmission path.

9. A method for isolating faults in an arrangement of dies comprising a first die coupled to a second die via a die-to-die interconnect, the method comprising:
   providing a first transmission path, along the die-to-die interconnect, from a transmitter associated with the first die to an asynchronous buffer associated with the second die;
   providing a second transmission path from voltage reference circuitry associated with the second die to the asynchronous buffer associated with the second die, wherein the voltage reference circuitry is configured to selectively output a first voltage or a second voltage, different from the first voltage; and
   simultaneously enabling both the first transmission path and the second transmission path to allow the asynchronous buffer to receive inputs from both the transmitter associated with the first die and the voltage reference circuitry associated with the second die, such that the inputs received by the asynchronous buffer are indicative of: (1) no failure in the die-to-die interconnect, (2) an open failure in the die-to-die interconnect, or (3) a short failure in the die-to-die interconnect.

10. The method of claim 9, wherein the asynchronous buffer is a single-ended unidirectional buffer.

11. The method of claim 9, wherein the asynchronous buffer has a threshold voltage amount equal to or less than half of a power supply voltage for the second die.

12. The method of claim 9, wherein the second die comprises a receiver, and wherein during fault isolation any inputs received at an input terminal associated with the second die are shorted with any inputs received from the voltage reference circuitry to an input terminal of the asynchronous buffer.

13. The method of claim 9, wherein the first voltage corresponds to a supply voltage associated with the second die, and wherein the second voltage corresponds to a ground voltage associated with the second die.

14. The method of claim 9, wherein the first transmission path has a lower impedance than the second transmission path.

15. A system comprising:
   a first die coupled to a second die via a first die-to-die interconnect and a second die-to-die interconnect;
   a first transmission path, along the first die-to-die interconnect, from a first transmitter associated with the first die to a first asynchronous buffer associated with the first die;
   a second transmission path, along the second die-to-die interconnect, from a second transmitter associated with the second die to a second asynchronous buffer associated with the second die;
   a third transmission path from first voltage reference circuitry associated with the first die to the first asynchronous buffer associated with the first die and a fourth transmission path from second voltage reference circuitry associated with the second die to the second asynchronous buffer associated with the second die, wherein each of the first voltage reference circuitry and the second voltage reference circuitry is configured to selectively output a first voltage or a second voltage, different from the first voltage; and
   control circuitry configured to simultaneously enable the first transmission path, the second transmission path, the third transmission path, and the fourth transmission path in order to detect any neighbor short between the first die-to-die interconnect and the second die-to-die interconnect based on inputs received by the first asynchronous buffer and the second asynchronous buffer.

16. The system of claim 15, wherein each of the first asynchronous buffer and the second asynchronous buffer is a single-ended unidirectional buffer.

17. The system of claim 16, wherein each of the first asynchronous buffer and the second asynchronous buffer has a threshold voltage amount equal to or less than half of a power supply voltage for each of the first die and the second die.

18. The system of claim 15, wherein the first voltage corresponds to a supply voltage associated with each of the first die and the second die, and wherein the second voltage corresponds to a ground voltage associated with each of the first die and the second die.

19. The system of claim 15, wherein the first transmission path has a lower impedance than the third transmission path, and wherein the second transmission path has a lower impedance than the fourth transmission path.

20. The system of claim 15, wherein the control circuitry is further configured to enable combinations of the first transmission path, the second transmission path, the third transmission path, and the fourth transmission path in order to detect: (1) no failure in the first die-to-die interconnect or the second die-to-die interconnect, (2) an open failure in the first die-to-die interconnect or the second die-to-die interconnect, or (3) a short failure in the first die-to-die interconnect or the second die-to-die interconnect based on inputs received by the first asynchronous buffer or the second asynchronous buffer.

* * * * *